INVENTOR
TSUTOMU HAYASHI

BY Paul M. Craig, Jr.

ATTORNEY 3,346,460
BOILING LIQUID NUCLEAR REACTOR HAVING TIERED, HORIZONTALLY EXTENDING COOLANT CHANNELS
Tsutomu Hayashi, Hitachi-shi, Japan, assignor to Hitachi, Ltd., Chiyoda-ku, Tokyo, Japan, a corporation of Japan
Filed Feb. 8, 1965, Ser. No. 431,097
1 Claim. (Cl. 176—54)

The present invention relates to nuclear reactors and more particularly to an improvement in the structure of boiling liquid type nuclear reactors.

The boiling liquid type nuclear reactor is such a reactor in which at least a portion of the coolant is converted into a state of vapor. The nuclear reactor of this type has a limited power density because of hydrodynamic instabilities induced by a lot of bubbles and coolant interactions between coolant channels. Further, in the nuclear reactor of this type, the heat flux is limited at the point where a lot of bubbles contact the fuel rods. In order to relieve these limitations, it is desirable to remove these bubbles formed on the surfaces of the fuel rods from them, and to minimize coolant interactions between coolant channels.

It is therefore the primary object of the present invention to provide a nuclear reactor of the type in which means are provided so that bubbles formed on the fuel rods during the operation of the reactor can quickly be discharged out of their positions of formation with the least possibility of filling the nuclear reactor with them.

According to the present invention, there is provided a nuclear reactor comprising a reactor vessel, a reactor core in said reactor vessel, vapor-liquid separators disposed on opposite sides of said reactor vessel, and associated coolant channels, said reactor core comprising a plurality of horizontally extending coolant channels stacked in tiered relation therein, each of said coolant channels being composed of a first channel closed at both ends and containing therein a fuel rod, said first channel defining a coolant passage between its wall and the fuel rod, a second channel closely parallelly arranged with said first channel and having its both ends extended outwardly through the wall of said reactor vessel to terminate in said vapor-liquid separators, a coolant inlet in said first channel, and a plurality of passages between said first channel and said second channel to provide means for guidance of bubbles, whereby bubbles of vapor formed on the surface of the fuel rods can be guided through said second channel together with the coolant into said vapor-liquid separators for separation of vapor from the coolant.

Figure 1:
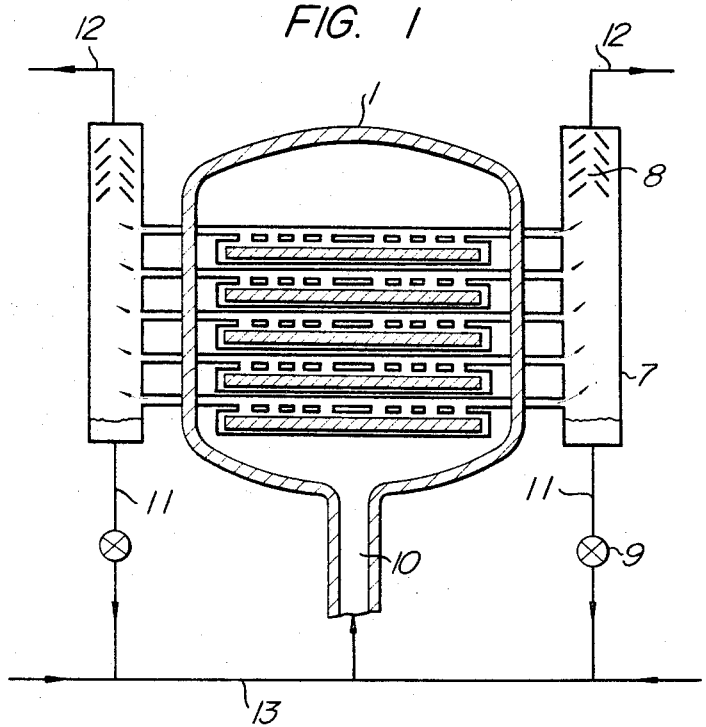
Figure 2:
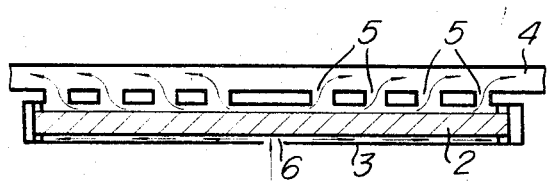

There are other objects and particularities of the present invention which will become obvious from the following description with reference to the accompanying drawings, in which:

FIG. 1 is a schematic vertical section of the nuclear reactor embodying the present invention, with the reactor core shown in the section to show the internal structures thereof; and FIG. 2 is an enlarged detailed view of a coolant channel.

Referring to FIG. 1, there is shown a reactor vessel 1 in which a plurality of horizontally running coolant channels are arranged in tiers. Each coolant channel consists of a first coolant channel 3 containing therein a fuel rod 2, and a second channel 4 which is closely parallelly arranged with the first coolant channel 3. There are provided a plurality of passages 5 between the first coolant channel 3 and the second coolant channel 4 to provide passages of bubbles therebetween as shown in FIG. 2. Each first coolant channel 3 is closed at both ends and has an inlet 6 for coolant at its bottom. Both ends of the second coolant channel 4 extend outwardly through the wall of the reactor vessel 1 to terminate in respective vapor-liquid separators 7. In each vapor-liquid separator 7, there is provided a drier unit 8 so that the coolant admitted therein in the form of bubbles through the second coolant channels 3 can be separated into steam and water and further moisture can be removed from steam.

The nuclear reactor with the above structure operates in a manner as follows. The coolant discharged from a main condenser (not shown) is fed through a feed line 13 and a coolant inlet nozzle 10 at the reactor vessel 1 into the reactor vessel 1. Then, the coolant is guided through the coolant inlet 6 into each coolant channel 3 to cool the fuel rod 2 therein. The coolant admitted into the first coolant channel 3 is heated by the heat of the fuel rod 2 to form bubbles on the surface of the fuel rod 2. The bubbles rise upward by the gravity force and pass through the passages 5 between the first coolant channel 3 and the second coolant channel 4 to enter the vapor-liquid separator 7 together with the coolant. The coolant fed into the vapor-liquid separator 7 is separated into steam and water by the drier unit 8, the steam being then fed through a vapor line 12 into a turbine (not shown), while the water being fed through a pipe line 11 into a pump 9 for recirculation through the system.

From the foregoing description, it will be understood that the above-described arrangement of the present invention is so effective that bubbles formed on the surface of the fuel rod during the operation of the nuclear reactor can easily be discharged outwardly of the reactor core from their positions of formation and there is the least possibility that the reactor is filled with such bubbles. Another advantage available from the present invention is that fairly uniform distribution of bubbles throughout the reactor core insures a minimum of a peak-average ratio of the neutron flux. The present invention is also advantageous in that small quantity of bubbles of vapor on the surface of the fuel rod insures a high burn-out heat flux and makes possible the reactor operation at a high power density. Since further, according to the inventive arrangement, the coolant channels are separately terminated in the vapor-liquid separators without communicating with one another therein, there is no interactions of flows with one another and thus the nuclear reactor of the present invention is free from any hydrodynamical instability which has hitherto been a cause of trouble with nuclear reactors of boiling liquid type. A further advantage is that a reduced amount of coolant flow for recirculation through the reactor will be possible because the limit of outlet steam quality can be set at larger value using the type of the present invention.

What is claimed is:

A nuclear reactor comprising a reactor vessel, a reactor core in said reactor vessel, vapor-liquid separators disposed on opposite sides of said reactor vessel, and associated coolant channels, said reactor core comprising a plurality of horizontally extending coolant channels stacked in tiered relation therein, each of said coolant channels being composed of a first coolant channel closed at both ends and containing therein a fuel rod, said first coolant channel defining a coolant passage between its wall and the fuel rod, a second coolant channel closely parallelly arranged with said first coolant channel and having its both ends extended outwardly through the wall of said reactor vessel to terminate in said vapor-liquid separators, a coolant inlet in said first coolant channel, and a plurality of passages between said first coolant channel and said second coolant channel, whereby bubbles formed on the surface of the fuel rods can be guided together with the coolant into said vapor-liquid separators for separation from the coolant.

References Cited

UNITED STATES PATENTS

| 3,070,529 | 12/1962 | Wigner | 176—54 |
| 3,180,802 | 4/1965 | West et al. | 176—54 |
| 3,205,147 | 9/1965 | Foure et al. | 176—54 |

FOREIGN PATENTS

| 1,252,670 | 12/1960 | France. |
| 1,336,626 | 7/1963 | France. |

L. DEWAYNE RUTLEDGE, *Primary Examiner.*

CARL D. QUARFORTH, *Examiner.*